(12) United States Patent
Hsu

(10) Patent No.: US 11,370,057 B2
(45) Date of Patent: Jun. 28, 2022

(54) FRICTION WELDING MACHINE FOR RADIATING FINS

(71) Applicant: TIANLE INTERNATIONAL CO., LTD., Taoyuan (TW)

(72) Inventor: Li-Huang Hsu, Taoyuan (TW)

(73) Assignee: TIANLE INTERNATIONAL CO., LTD., Taoyuan (TW)

( * ) Notice: Subject to any disclaimer, the term of this patent is extended or adjusted under 35 U.S.C. 154(b) by 47 days.

(21) Appl. No.: 17/247,089

(22) Filed: Nov. 30, 2020

(65) Prior Publication Data
US 2022/0001485 A1 Jan. 6, 2022

(30) Foreign Application Priority Data
Jul. 1, 2020 (TW) .................................. 109122192

(51) Int. Cl.
*B23K 20/00* (2006.01)
*B23K 20/12* (2006.01)
*F28C 1/00* (2006.01)

(52) U.S. Cl.
CPC .............. *B23K 20/129* (2013.01); *F28C 1/00* (2013.01); *F28C 2001/006* (2013.01)

(58) Field of Classification Search
CPC .. B23K 20/122; B23K 20/124; B23K 20/129; B23K 2101/14
See application file for complete search history.

(56) References Cited

U.S. PATENT DOCUMENTS

| | | | | |
|---|---|---|---|---|
| 2014/0022728 A1* | 1/2014 | Siracki | ................... | H05K 7/209 165/185 |
| 2021/0015005 A1* | 1/2021 | Yu | ........................ | H05K 5/0217 |

* cited by examiner

*Primary Examiner* — Erin B Saad
(74) *Attorney, Agent, or Firm* — Wang Law Firm, Inc.

(57) ABSTRACT

A friction welding machine for radiating fins is disclosed, which mainly uses a moving unit to drive a friction joint unit to approach the plurality of radiating fins, and a friction rod provided in the moving unit rotates at a high speed to penetrate the radiating fins. The radiating fins are then welded together through the heat generated by high-speed rotation friction to achieve the purpose of improving the welding quality of the radiating fins and reducing the cost.

8 Claims, 7 Drawing Sheets

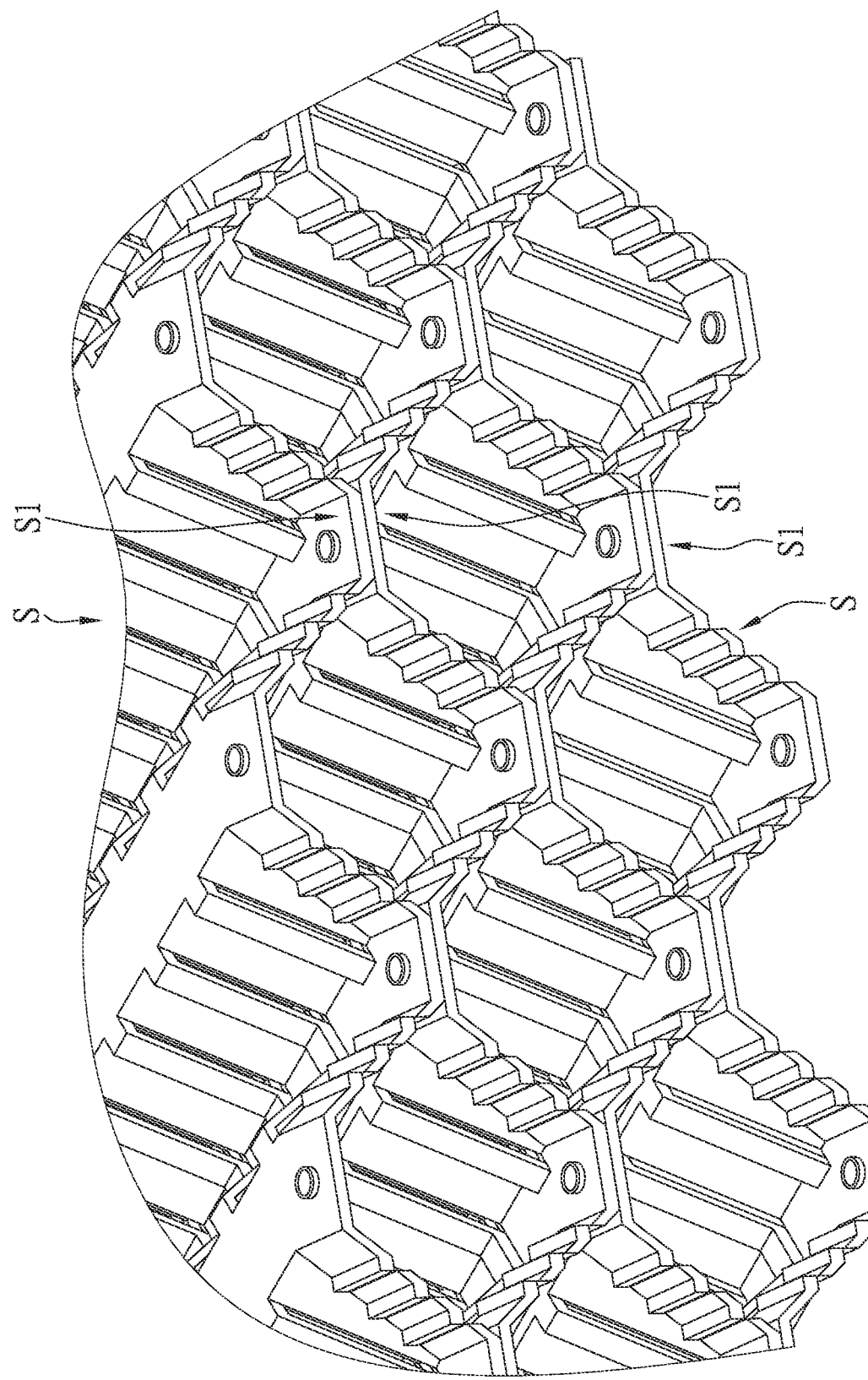

FRICTION WELDING MACHINE FOR RADIATING FINS

BACKGROUND

Field of the Invention

The present invention relates to a gluing machine, and more particularly to a friction welding machine for radiating fins.

Related Prior Art

Generally, honeycomb radiating fins are installed in the cooling water tower. The main function of the radiating fins is to increase the flow path of the water in the cooling tower, so that the water in the cooling tower can more fully contact the hot air, and the heat dissipation effect is better.

Since most of the radiating fins in the cooling water towers on the market are made of plastic, and in order to facilitate the installation of multiple radiating fins in the cooling water tower, generally the radiating fins are superposed and fixed during the manufacturing stage. The material of the radiating fins is mostly plastic, so in the manufacturing stage, a heat gun is used to weld multiple radiating fins.

However, because the multiple radiating fins must be welded manually, not only is the quality unstable because the manual welding easily causes the welding position to be inaccurate, but also because manual welding requires a lot of manpower and the production speed is extremely slow, resulting in significant increase in manufacturing cost of the radiating fin.

In order to overcome the aforementioned problems, it is necessary to provide a friction welding device for radiating fins to effectively overcome the aforementioned shortcomings.

SUMMARY

The present invention is to provide a friction welding machine for radiating fins, the main objective of which is to solve the problem of unstable quality caused by manual welding of radiating fins, thereby improving the quality of radiating fins.

Another objective of the present invention is to solve the problem of increasing the manufacturing cost caused by the labor consumed by manual welding of the radiating fins, thereby reducing the cost.

To achieve the above objectives, a friction welding device for radiating fins provided by the invention comprises:

a base including a bottom plate and two side plates located on opposite sides of the bottom plate, the two side plates facing each other, and a plurality of rods being inserted between the two side plates;

a moving unit including at least two moving components, each of the moving components including a drive source, a drive rod, and a drive plate, wherein the drive source is disposed to the base, the drive rod is connected to the drive source, the drive plate is assembled on the drive rod and located between the two side plates, each of the rods penetrates the drive plate, the drive source is used to transmit power to the drive plate through the drive rod, and a processing space is formed between the drive plates of the two moving components; and a friction joint unit including at least two friction joint components assembled to the drive plate, each of the two friction joint components including a power source, a transmission member, a rotation rod, a first rotating member, a second rotating member, and a friction rod, wherein the power source is coupled to the drive plate, the transmission member is drivingly connected to the power source and the rotation rod so that the power of the power source is transmitted to the rotation rod to drive the rotation rod to rotate, the first rotating member is sleeved on the rotation rod, the second rotating member contacts the first rotating member, the second rotating member is sleeved on the friction rod, and the friction rod is inserted through the drive plate and into the processing space.

From the foregoing, it can be seen that the friction welding machine for radiating fins of the present invention mainly uses the moving unit to drive the friction joint unit to approach the plurality of radiating fins, and the friction rod provided in the moving unit rotates at a high speed to penetrate the radiating fins. The radiating fins are then welded together through the heat generated by high-speed rotation friction to achieve the purpose of improving the welding quality of the radiating fins and reducing the cost.

BRIEF DESCRIPTION OF THE DRAWINGS

FIG. 5 is a schematic diagram of the radiating fins after being processed.

DETAILED DESCRIPTION

Figure 1A:
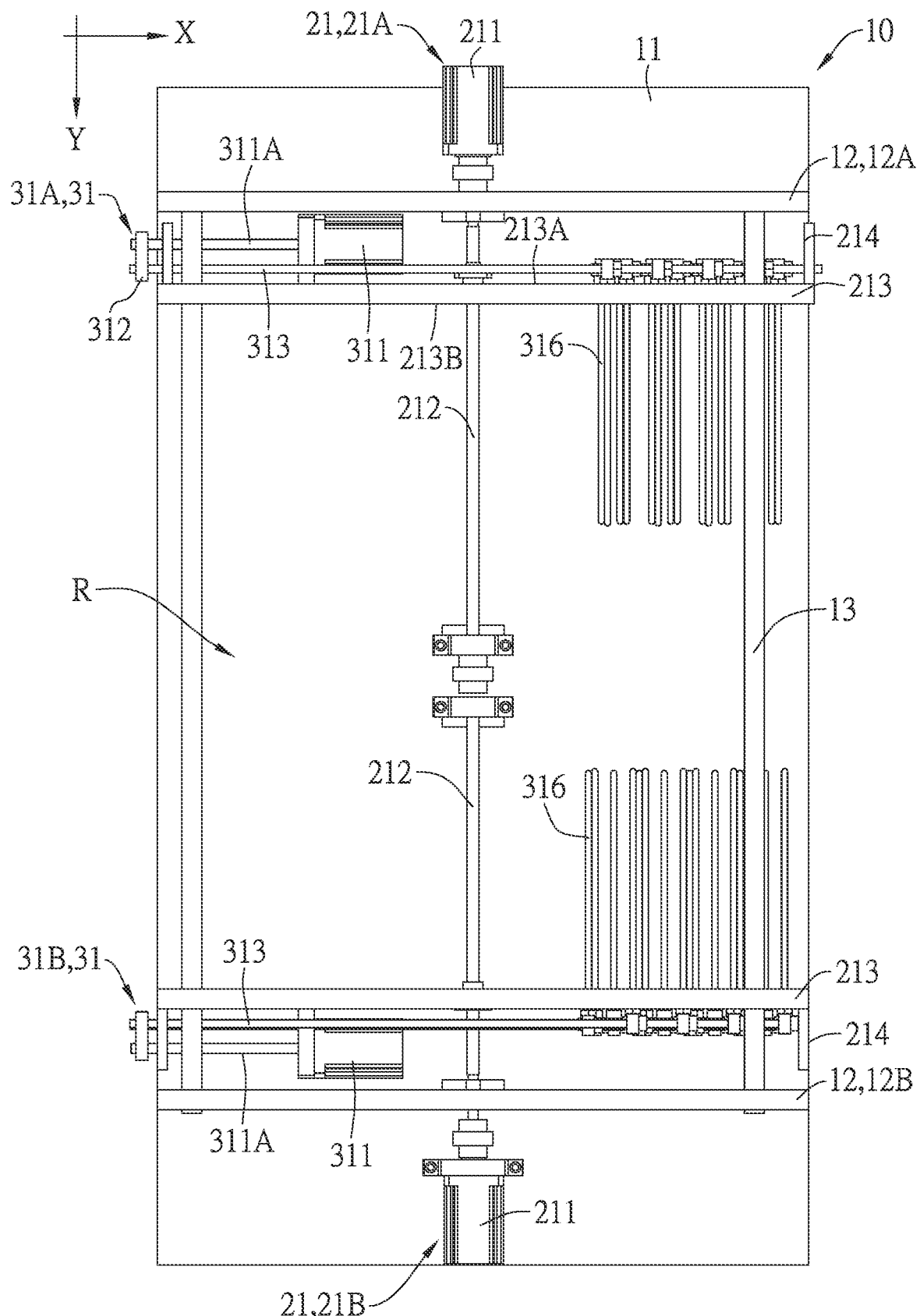
FIG. 1A is a schematic diagram of the friction welding machine for radiating fins in the open state.
Figure 1B:
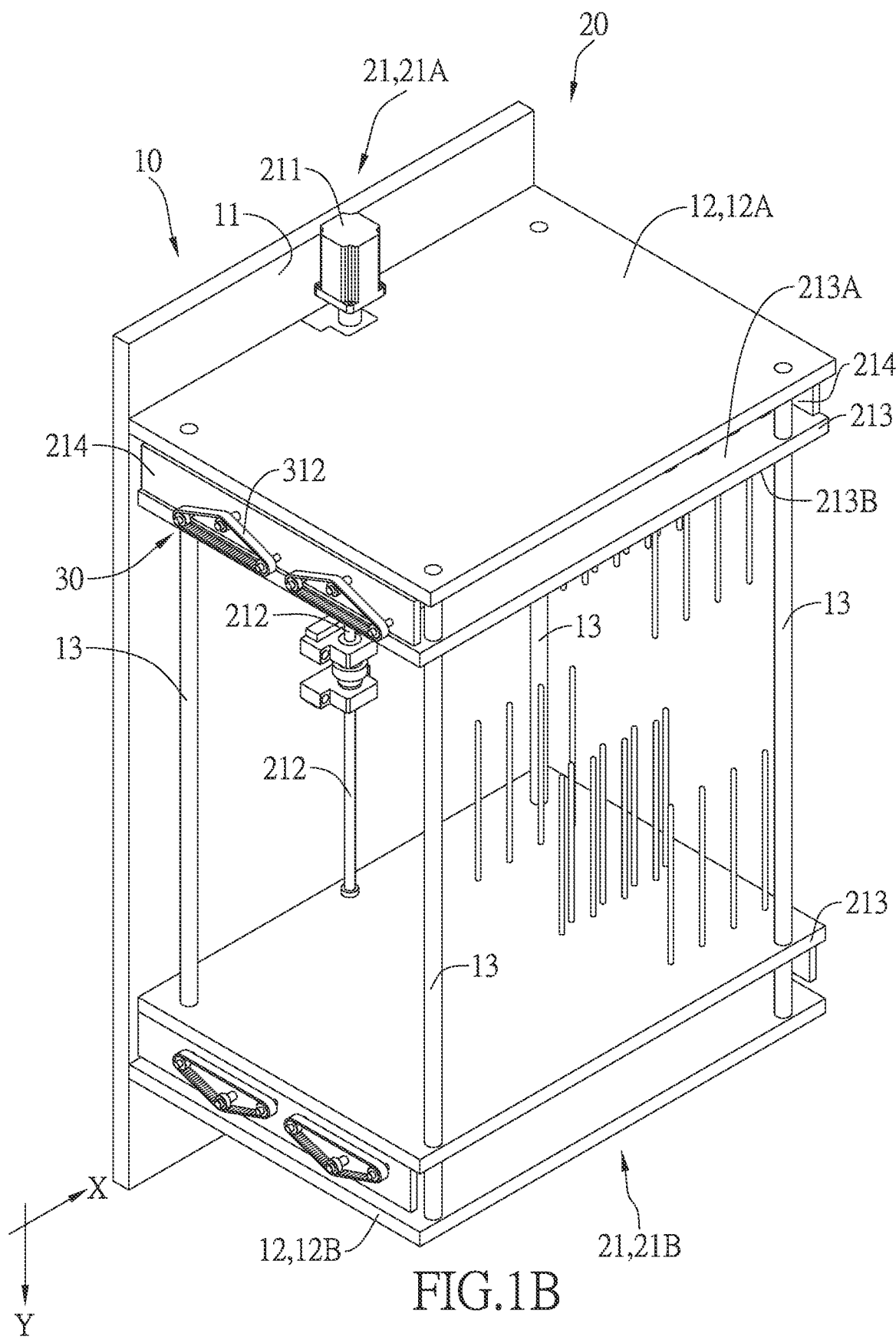
FIG. 1B is a schematic diagram of the friction welding machine for radiating fins in the open state.
Figure 2:
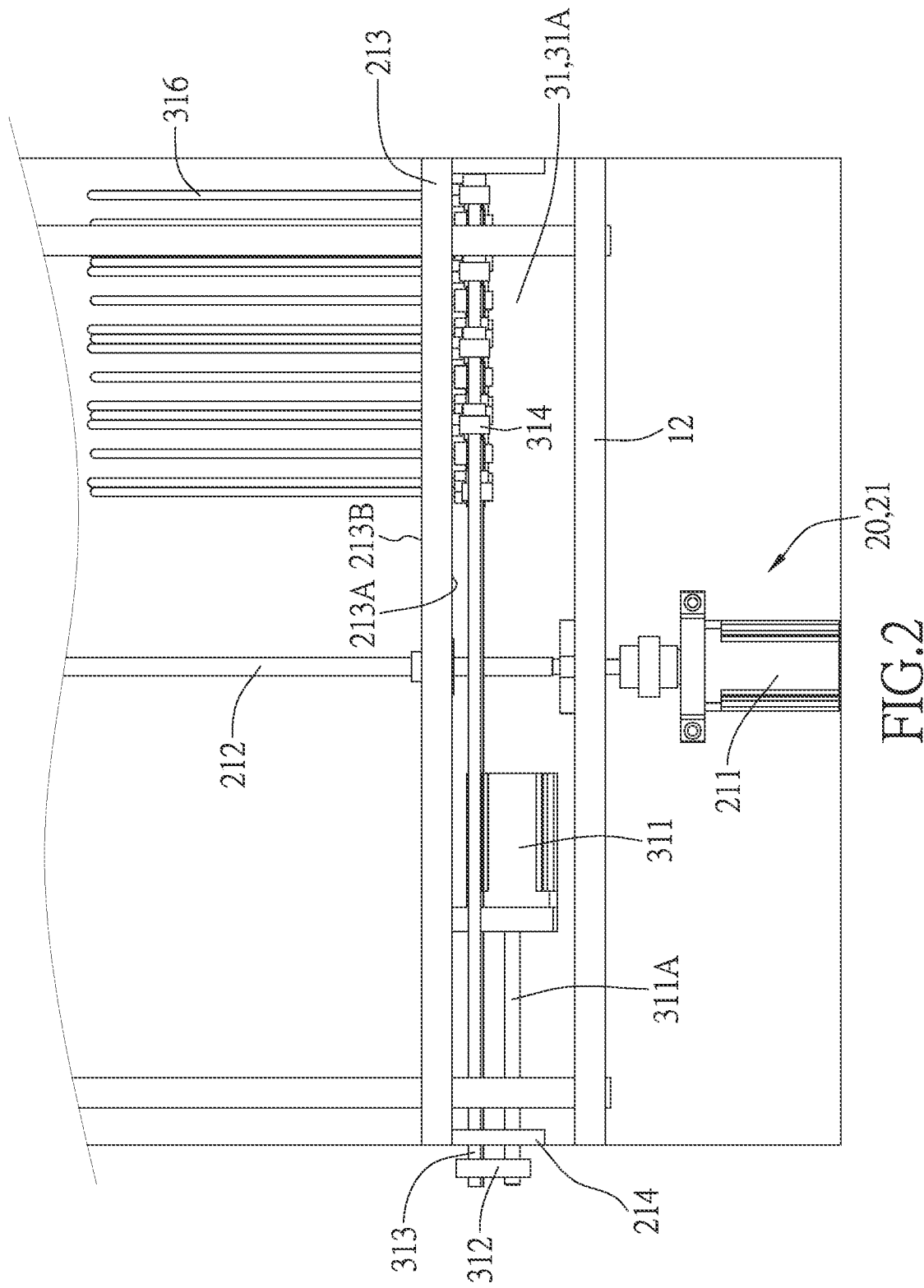
FIG. 2 is a magnified schematic diagram of a part of the friction welding machine for radiating fins in the open state.
Figure 3A:
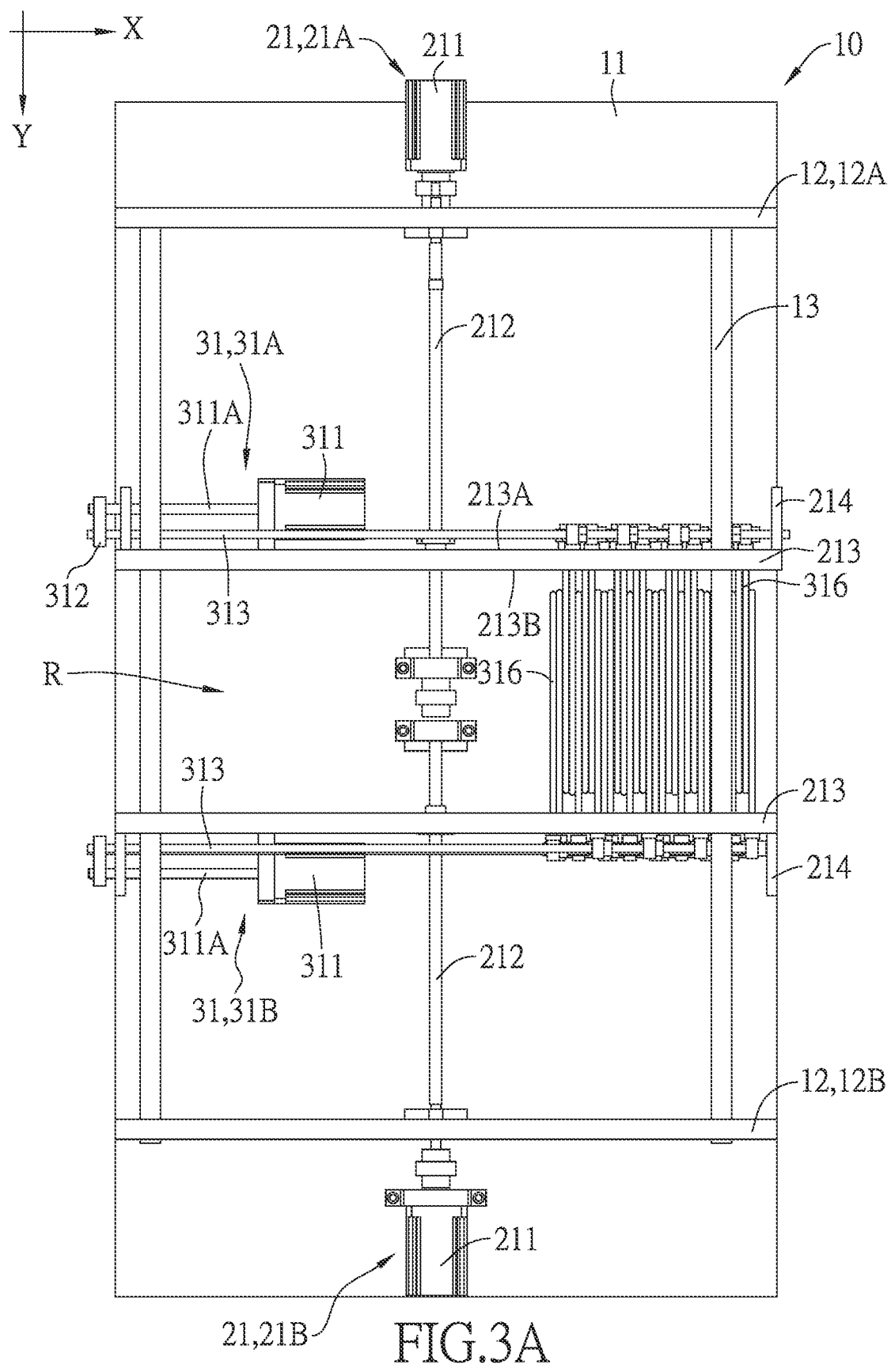
FIG. 3A is a schematic diagram of the friction welding machine for radiating fins in the closed state.
Figure 3B:
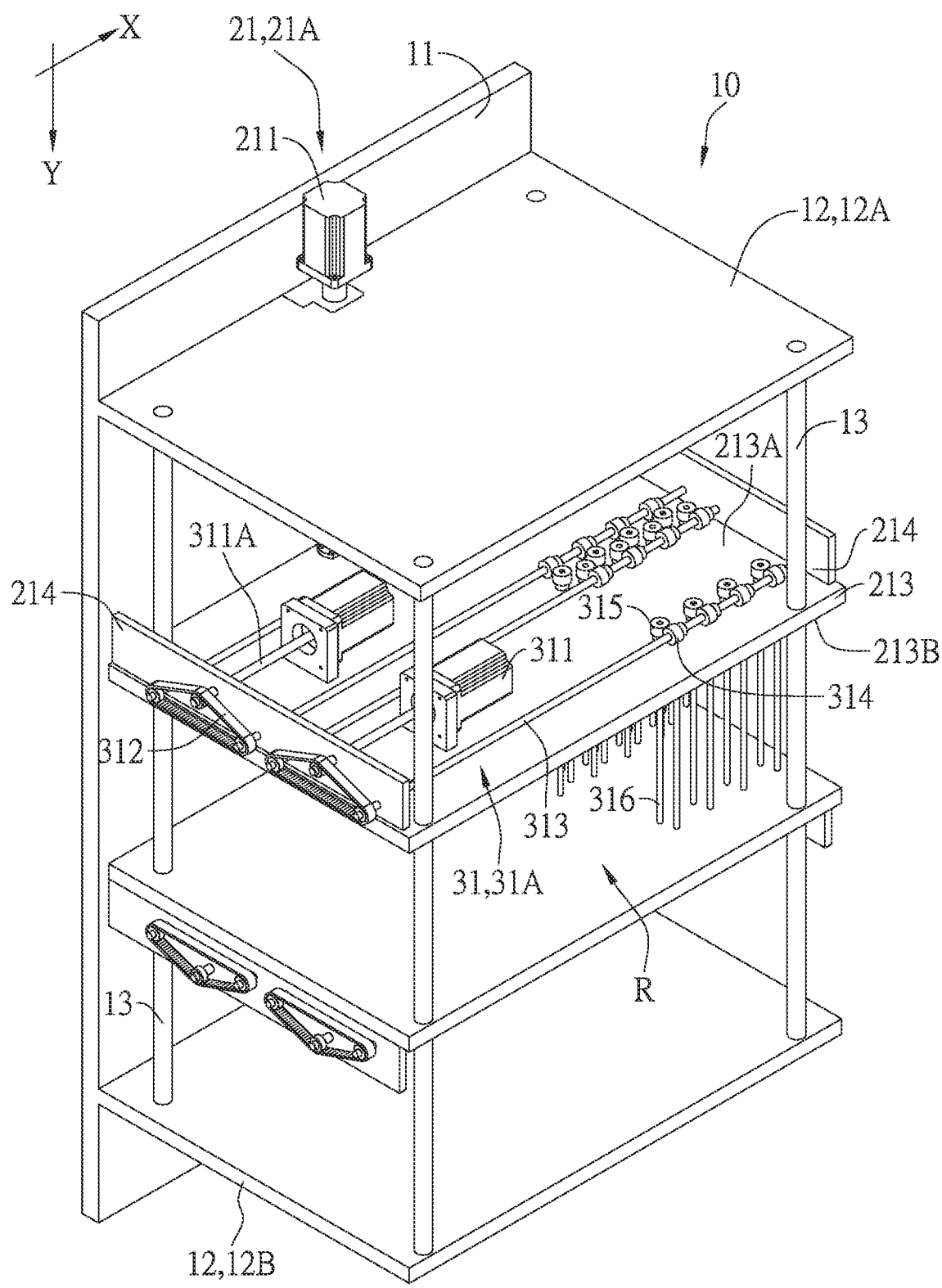
FIG. 3B is a schematic diagram of the friction welding machine for radiating fins in the closed state.

The present invention will be clearer from the following description when viewed together with the accompanying drawings, which show, for purpose of illustrations only, the preferred embodiment in accordance with the present invention.

Referring to FIGS. 1A-5, the present invention provides a friction welding device for radiating fins, which comprises: a base 10, a moving unit 20, and a friction joint unit 30.

The base 10 includes a bottom plate 11 and two side plates 12 located on opposite sides of the bottom plate 11. The extending direction of the bottom plate 11 is perpendicular to that of the two side plates 12, and the two side plates 12 are rectangular and face each other. An extending direction between the two side plates 12 is a transverse direction Y, a plurality of rods 13 is inserted between the two side plates 12, and each of the rods 13 extends along the transverse direction Y. In this embodiment, the number of the rods 13 is four, and the four rods 13 are respectively fixed to the four corners of the two side plates 12.

The moving unit 20 includes two moving components 21. Each of the moving components 21 includes a drive source 211, a drive rod 212, and a drive plate 213. The drive source 211 is disposed to the base 10, the drive rod 212 is connected to the drive source 211 and extends along the transverse direction Y, and the drive plate 213 is assembled on the drive rod 212 so that the drive plate 213 is driven to move by the drive rod 212. The drive plate 213 is located between the two side plates 12. Each of the rods 13 penetrates the drive plate 213, so that the drive plate 213 can be moved along the transverse direction Y. The drive source 211 is used to transmit power to the drive plate 213 through the drive rod 212, so that the drive plate 213 is driven to move along the transverse direction Y. In this embodiment, the two side plates 12 are defined as a first side plate 12A and a second side plate 12B, and the two moving components 21 are defined as a first moving component 21A and a second moving component 21B. The drive source 211 of the first moving component 21A is assembled to the first side plate 12A. The drive plate 213 of the first moving component 21A is closer to the first side plate 12A and farther away from the second side plate 12B. The drive source 211 of the second moving component 21B is assembled to the second side plate 12B. The drive plate 213 of the second moving component 21B is closer to the second side plate 12B and farther away from the first side plate 12A. A processing space R is formed between the drive plate 213 of the first moving component 21A and the drive plate 213 of the second moving component 21B.

The friction joint unit 30 includes two friction joint components 31 assembled to the drive plate 213, and the two friction joint components 31 are defined as a first friction joint component 31A and a second friction joint component 31B. The first friction joint component 31A is assembled to the drive plate 213 of the first moving component 21A, and the second friction joint component 31B is assembled to the drive plate 213 of the second moving component 21B. Each of the friction joint components 31 includes a power source 311, a transmission member 312, a rotation rod 313, a first rotating member 314, a second rotating member 315, and a friction rod 316. The power source 311 is coupled to the drive plate 213, and the transmission member 312 is drivingly connected to the power source 311 and the rotation rod 313, so that the power of the power source 311 is transmitted to the rotation rod 313 to drive the rotation rod 313 to rotate. The rotation rod 313 extends along a longitudinal direction X which is perpendicular to the transverse direction Y. In this embodiment, the transmission member 312 is a belt that winds around a spindle 311A of the power source 311 and the rotation rod 313 so that the power source 311 drives the rotation rod 313 to rotate. The first rotating member 314 is sleeved on the rotation rod 313, so that the first rotating member 314 rotates with the rotation rod 313, and the second rotating member 315 contacts the first rotating member 314, so that the first rotating member 314 drives the second rotating member 315 to rotate. The second rotating member 315 is sleeved on the friction rod 316 to drive the friction rod 316 to rotate. The friction rod 316 extends along the transverse direction Y and is inserted through the drive plate 213 and into the processing space R, and the friction rod 316 is provided to penetrate a plurality of radiating fins S.

In a preferred embodiment, the drive plate 213 includes a first side surface 213A and a second side surface 213B. The first side surface 213A faces a corresponding one of the side plates 12, and the second side surface 213B faces the processing space R. The power source 311, the rotation rod 313, the first rotating member 314, and the second rotating member 315 are located on the first side surface 213A.

In a preferred embodiment, the drive plate 213 includes a mounting plate 214 on each of two sides thereof along the longitudinal direction X. Both ends of the rotation rod 313 are respectively rotatably disposed to the mounting plate 214, and the spindle 311A of the power source 311 is rotatably disposed to the mounting plate 214 as well.

Figure 4:
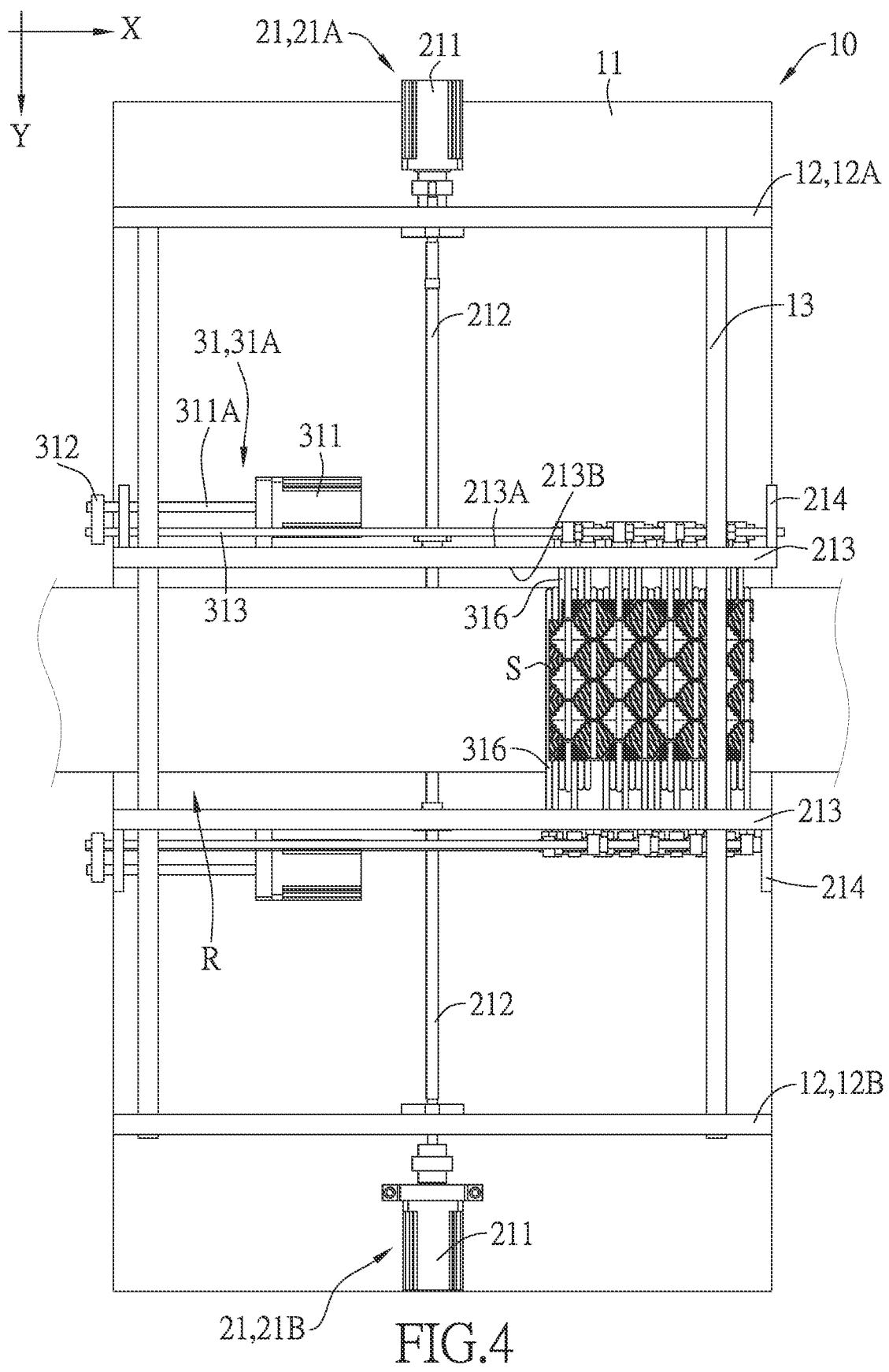
FIG. 4 is a schematic diagram of the friction welding machine for radiating fins in the closed state in which the radiating fins are being processed.

The above is the structural configuration and connection relationship of the present invention. The operation mode of the present invention is as follows:

Please refer to FIGS. 4 and 5. First, the drive plate 213 is driven to move along the transverse direction Y through the drive source 211, so that the two drive plates 213 approach or move away from each other, and the power source 311 drives the transmission member 312 to transmit the rotation kinetic energy to the rotation rod 313 to drive the rotation rod 313 to rotate, and further to drive the first rotating member 314 sleeved on the rotation rod 313 to rotate. The first rotating member 314 contacts the second rotating member 315 to drive the second rotating member 315 to rotate so as to further drive the friction rod 316 to rotate. The user then places a plurality of stacked radiating fins S into the processing space R. Each of the radiating fins S includes at least one abutting portion 51, and the abutting portion 51 of each of the radiating fins S is abutted against to the abutting portion Si of an adjacent radiating fin S. Since the friction rod 316 rotates at a high speed, and each friction rod 316 penetrates the abutting portion Si of each radiating fin S and produces high heat, and then the portion of the abutting portion Si of each radiating fin S where the friction rod 316 penetrates is melted, so that the adjacent radiating fins S are bonded to each other to complete the joining operation.

While we have shown and described various embodiments in accordance with the present invention, it is clear to those skilled in the art that further embodiments may be made without departing from the scope of the present invention.

What is claimed is:

1. A friction welding device for radiating fins comprising:
   a base including a bottom plate and two side plates located on opposite sides of the bottom plate, the two side plates facing each other, and a plurality of rods being inserted between the two side plates;
   a moving unit including at least two moving components, each of the moving components including a drive source, a drive rod, and a drive plate, wherein the drive source is disposed to the base, the drive rod is connected to the drive source, the drive plate is assembled on the drive rod and located between the two side plates, each of the rods penetrates the drive plate, the drive source is used to transmit power to the drive plate through the drive rod, and a processing space is formed between the drive plates of the two moving components; and
   a friction joint unit including at least two friction joint components assembled to the drive plate, each of the two friction joint components including a power source, a transmission member, a rotation rod, a first rotating member, a second rotating member, and a friction rod, wherein the power source is coupled to the drive plate, the transmission member is drivingly connected to the power source and the rotation rod so that the power of the power source is transmitted to the rotation rod to drive the rotation rod to rotate, the first rotating member is sleeved on the rotation rod, the second rotating member contacts the first rotating member, the second rotating member is sleeved on the friction rod, and the friction rod is inserted through the drive plate and into the processing space.

2. The friction welding device for radiating fins as claimed in claim 1, wherein an extending direction between the two side plates is a transverse direction, the rods, the drive rod and the friction rod extend along the transverse direction, and the rotation rod extends along a longitudinal direction which is perpendicular to the transverse direction.

3. The friction welding device for radiating fins as claimed in claim 1, wherein the drive plate includes a first side surface and a second side surface, the first side surface faces a corresponding one of the side plates, and the second side surface faces the processing space, the power source, the rotation rod, the first rotating member, and the second rotating member are located on the first side surface.

4. The friction welding device for radiating fins as claimed in claim 2, wherein the drive plate includes a mounting plate on each of two sides thereof along the longitudinal direction, both ends of the rotation rod are respectively rotatably disposed to the mounting plate, and a spindle of the power source is rotatably disposed to the mounting plate.

5. The friction welding device for radiating fins as claimed in claim 1, wherein an extending direction of the bottom plate is perpendicular to that of the two side plates.

6. The friction welding device for radiating fins as claimed in claim 1, wherein the number of the rods is four, and the four rods are respectively fixed to four corners of the two side plates.

7. The friction welding device for radiating fins as claimed in claim 1, wherein the two side plates are defined as a first side plate and a second side plate, and the number of at least two moving components is two, and the two moving components are defined as a first moving component and a second moving component, the drive source of the first moving component is assembled to the first side plate, the drive plate of the first moving component is closer to the first side plate and farther away from the second side plate, the drive source of the second moving component is assembled to the second side plate, the drive plate of the second moving component is closer to the second side plate and farther away from the first side plate, the number of the at least two friction joint components is two, the two friction joint components are defined as a first friction joint component and a second friction joint component, the first friction joint component is assembled to the drive plate of the first moving component, and the second friction joint component is assembled to the drive plate of the second moving component.

8. The friction welding device for radiating fins as claimed in claim 1, wherein the transmission member is a belt that winds around a spindle of the power source and the rotation rod so that the power source drives the rotation rod to rotate.

\* \* \* \* \*